United States Patent [19]
Lee

[11] Patent Number: 5,741,103
[45] Date of Patent: Apr. 21, 1998

[54] SECURING STRUCTURE FOR AIR VALVES

[76] Inventor: Ching-Jong Lee, 5F-1, No. 86, Lane 44, Sec. 3, Chung-Hua E. Rd., Tainan, Taiwan

[21] Appl. No.: 792,755

[22] Filed: Feb. 4, 1997

[51] Int. Cl.⁶ .................... F16B 35/06; F16B 37/00
[52] U.S. Cl. .................... 411/366; 411/427; 411/410; 137/223
[58] Field of Search .................. 411/3–5, 185, 411/186, 427, 429, 410, 366; 137/223

[56] References Cited

U.S. PATENT DOCUMENTS

| | | | |
|---|---|---|---|
| 2,959,204 | 11/1960 | Rigot | 411/186 |
| 3,140,636 | 7/1964 | Grimm | 411/427 |
| 3,205,756 | 9/1965 | Ollis, Jr. et al. | 411/427 |
| 3,216,302 | 11/1965 | Kluth | 411/427 |

FOREIGN PATENT DOCUMENTS 2015 of 1915 United Kingdom ............... 411/427

*Primary Examiner*—Neill R. Wilson
*Attorney, Agent, or Firm*—Varndell Legal Group

[57] ABSTRACT

An improved securing structure for air valves including a nut being a tapered hexagonal rod structure for use with suitable wrenches. The nut has a projecting configuration to prevent the problem with the prior art in which the nut cannot be properly tightened or loosened when the nut is positioned too near the rim of the tire.

2 Claims, 5 Drawing Sheets

5,741,103

SECURING STRUCTURE FOR AIR VALVES

BACKGROUND OF THE INVENTION (a) Field of the Invention

The present invention relates generally to a and more particularly to a nut for locking an air valve of tires.

(b) Description of the Prior Art

Conventional wheel rims are made of alloys. Since the outer side of the rim has a curved flange, the installation of air valves and the locking of nuts thereon is not easy with an ordinary wrench. Therefore, a rubber air valve is developed. The rubber air valve includes a tightening seat. By pulling a rubber seat of the air valve outwardly from the rim, the seat may be fastened to the rim. However, the air valve thus installed may shake and become loosened, and air leakage may easily result.

With reference to FIGS. 1 and 2, the rubber air valve is secured by means of pulling and subsequent tightening. The air valve may easily become disengaged, and air leakage may occur when subjected to shock. FIGS. 3 and 4 illustrate two other prior air valves which are locked by means of nuts. However, as the nut is positioned too near the rim (see FIG. 4), it is likely to sink into the counter-sunken hole of the rim, thus obstructing use of a nut driver with a chuck sleeve to tighten the nuts. Furthermore, the projecting flange of the rim may obstruct use of a combination wrench as well. The cause is this problem is that the nut is enclosed by the rim.

In brief, the prior art illustrated in FIGS. 1 and 2 have the drawbacks that the air valves cannot be firmly secured in position after installation. The air valve may easily become loosened to result in air leakage. Whereas, with the prior art illustrated in FIGS. 3 and 4, although the air valve may be secured in place after installation with the use of the nut, the relative position of the nut and the rim may obstruct use of ordinary wrenches.

SUMMARY OF THE INVENTION

An primary object of the present invention is to provide a nut for locking an air valve of tires, which may be tightened to secure the air valve firmly in position to prevent air leakage.

DETAILED DESCRIPTION OF THE PREFERRED EMBODIMENT

Figure 2:
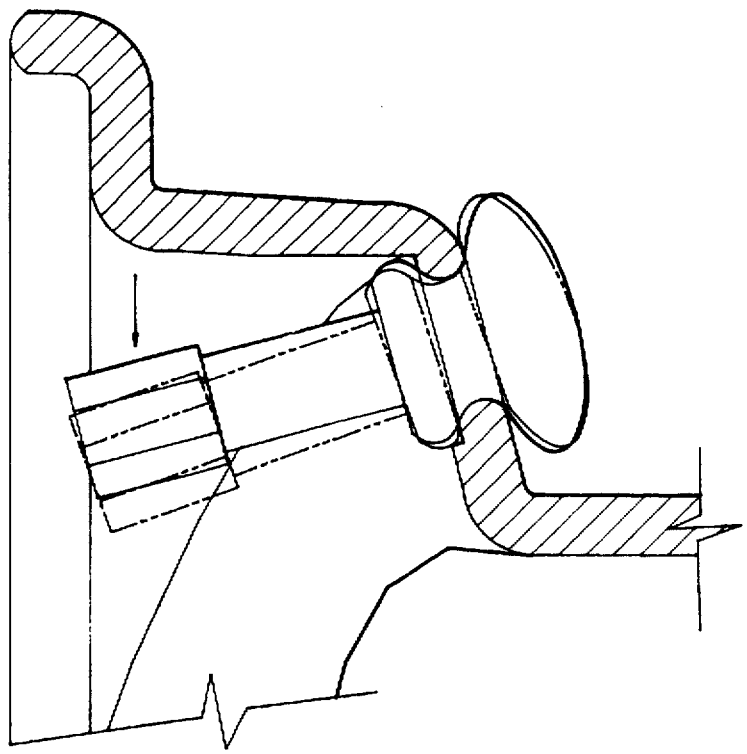
FIG. 2 is schematic sectional view of the prior rubber air valve in FIG. 1.
Figure 1:
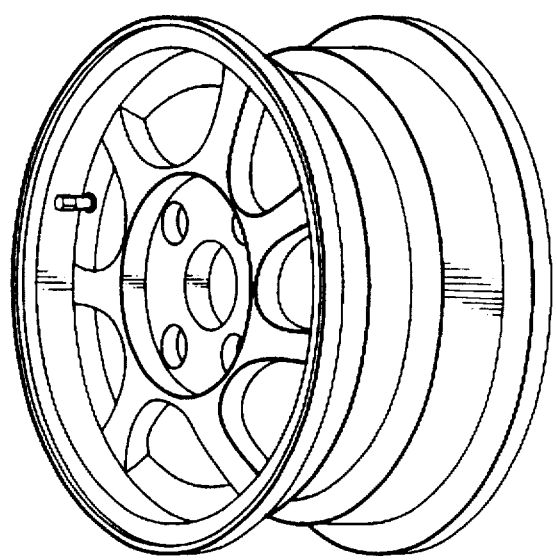
FIG. 1 is a schematic view of a prior rubber air valve in use.
Figure 4:
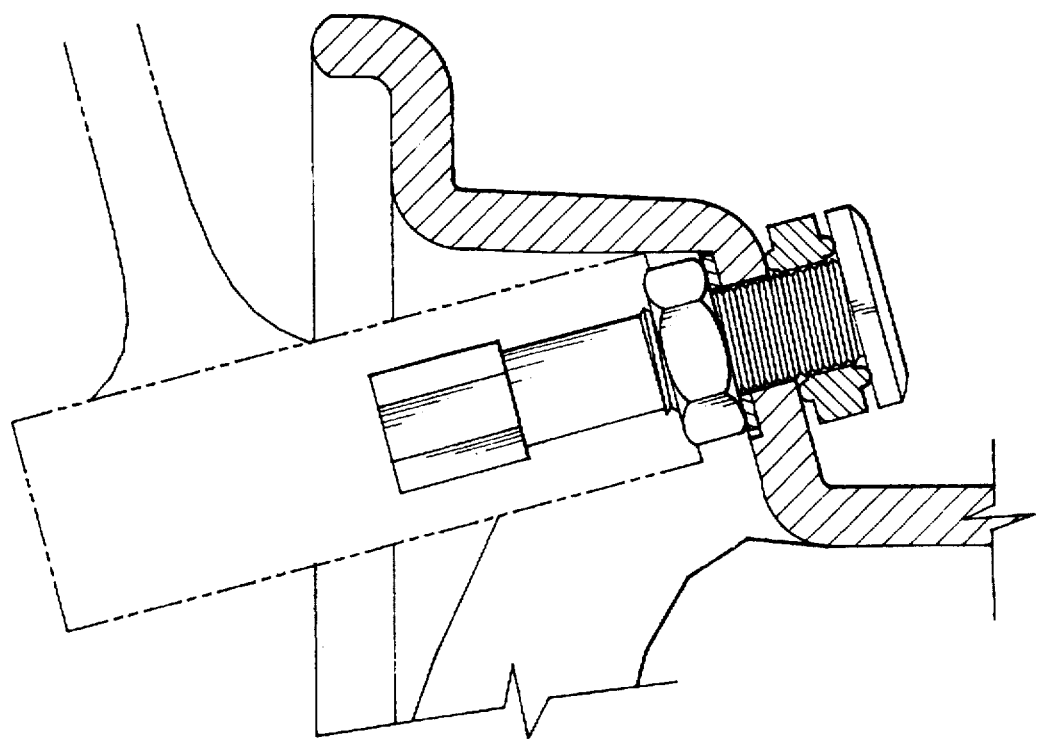
FIG. 4 is a schematic sectional view of the prior air valve of FIG. 3.
Figure 3:
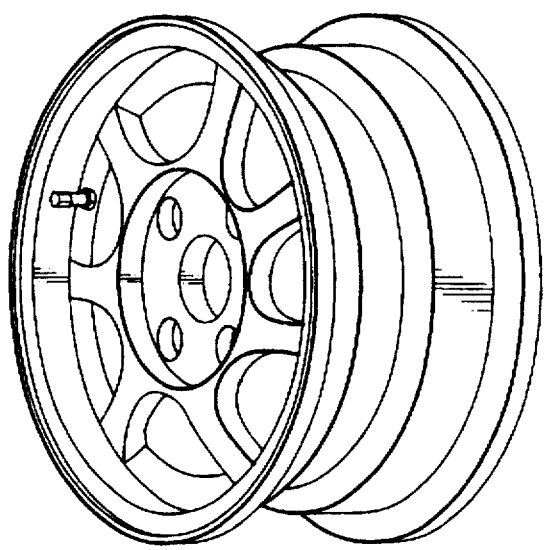
FIG. 3 is a schematic view of another prior air valve in use.
Figure 6:
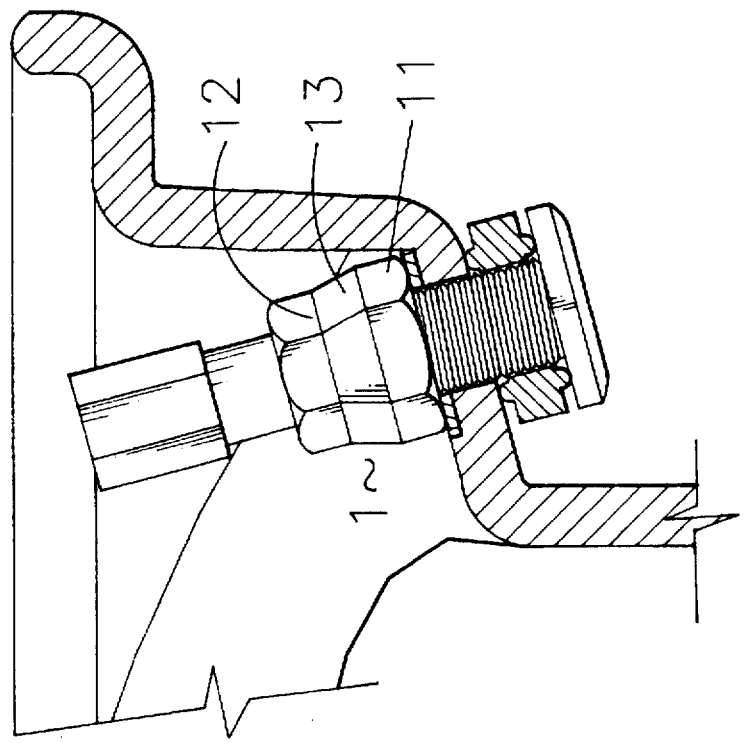
FIG. 6 is a sectional view of the present invention.
Figure 5:
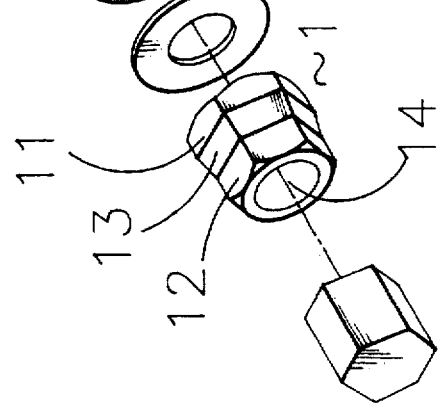
FIG. 5 is a schematic exploded view of the present invention.
Figure 7:
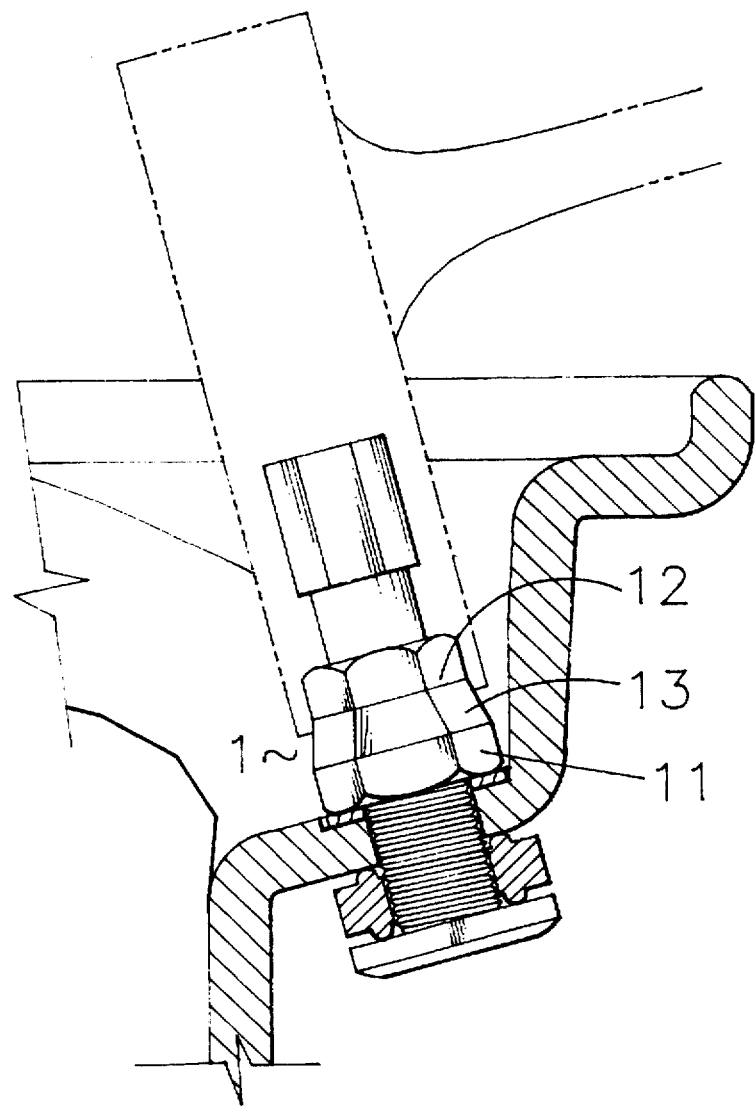
FIG. 7 is a schematic view of the present invention in use.

With reference to FIG. 5, a nut 1 may be divided into three sections, namely, a large nut section 11 of about 13 mm, a small nut section 12 of about 12 mm, and an intermediate nut section 13 of about 13 mm connecting the large nut section 11 and the small nut section 12. The nut 1 is provided with a through screw hole 14. By means of this design, the nut 1 is substantially projecting and is prevented from getting to close to the rim, which may obstruct tightening of the nut 1. Referring to FIGS. 6 and 7, when the large nut section 11 is too near the rim, the user may instead tighten the nut by applying any kind of wrenches to the intermediate nut section 13 or the small nut section 12. Furthermore, as the precision in manufacturing wrenches is not always consistent, in order to prevent ineffective tightening of the nuts due to differences in precision of the tool, the intermediate nut section 13 of a size between the large nut section 11 and the small nut section 12 provides a solution.

In the present invention, as air valves may be secured at the rim by nuts, the problem with rubber air valves, i.e., the air valve may become loosened to result in air leakage, may be eliminated. Besides, since the nut 1 according to the present invention has three different parts of three different sizes and since the nut 1 is configured to project upwardly slightly, a combination wrench may easily hold and turn the nut 1. And when the wrench is not made with a high precision, the wrench may hold the intermediate nut section 13 to tighten or loosen the nut 1.

Figure 9:
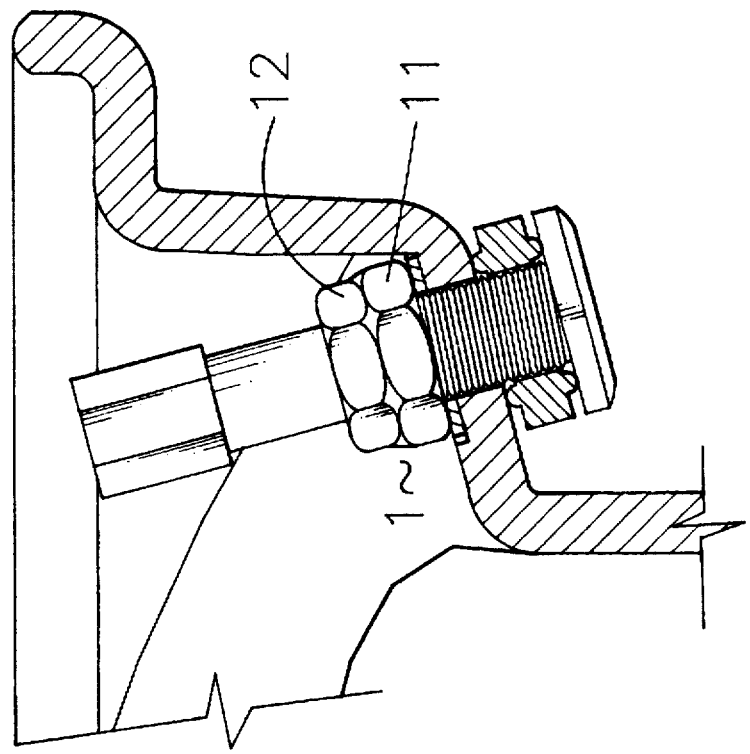
FIG. 9 is a sectional view of the preferred embodiment of FIG. 8.
Figure 8:
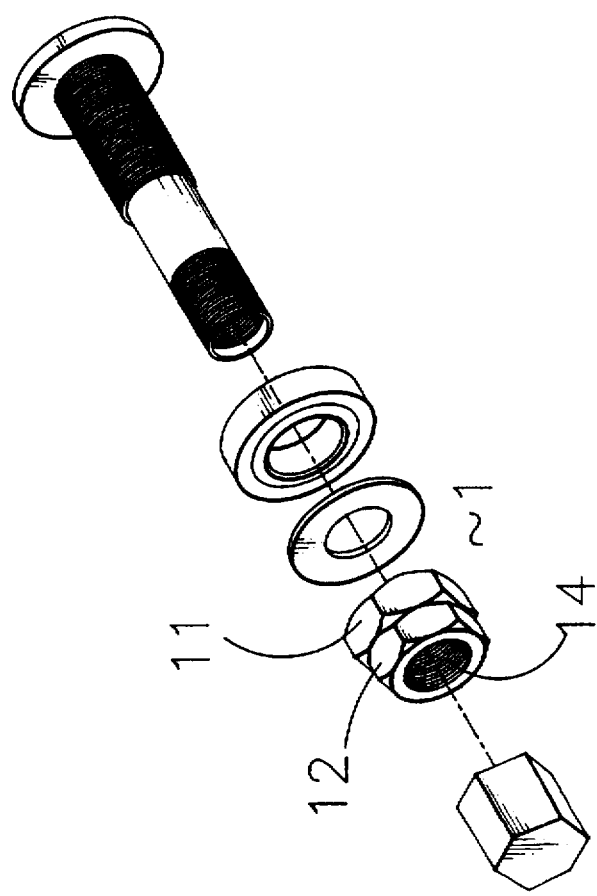
FIG. 8 is a schematic exploded view of another preferred embodiment of the present invention.

FIGS. 8 and 9 show another preferred embodiment of the present invention, in which the intermediate nut section 13 is eliminated.

In summary, the nut according to the present invention allows firm mounting of air valves to prevent loosening or air leakage. The height of the nut is also increased to prevent the rim from obstruction use of wrenches to tighten or loosen the nut. Besides, a greater variety of wrenches may be used with the nut of the invention.

Although the present invention has been illustrated and described with reference to the preferred embodiment thereof, it should be understood that it is in no way limited to the details of such embodiment but is capable of numerous modifications within the scope of the appended claims.

I claim:

1. An air valve stem and nut assembly for tires comprising a threaded valve stem and nut having interior threads and threaded on the valve stem and adapted to tighten the air valve stem within a hole arranged on a rim of a wheel, the nut having a bottom with a large nut section, a middle with an intermediate nut section and a top with a small nut section; the small, intermediate and large nut sections arranged along an axial direction of the nut; a diameter of the large nut section is greater that a diameter of the small nut section, and the intermediate nut section has a gradient diameter increasing from the small nut section to the large nut section and beginning with a diameter matching the diameter of the small nut section and ending with a diameter matching the diameter of the large nut section, and the small, intermediate and large nut sections respectively having an identical number of sides and corners adapted to receive an opening of a wrench for turning the nut; and respective corners of the small, intermediate and large nut sections are arranged to intersect a plane passing through the axis of the nut.

2. An air valve stem and nut assembly for tires comprising a threaded valve stem and nut having interior threads and threaded on the valve stem and adapted to tighten the air valve stem within a hole arranged on a rim of a wheel, the nut having a bottom with a large nut section, a middle with an intermediate nut section and a top with a small nut section; the small, intermediate and large nut sections arranged along an axial direction of the nut; a diameter of the large nut section is greater that a diameter of the small nut section, and the intermediate nut section has a gradient diameter increasing from the small nut section to the large nut section and beginning with a diameter matching the diameter of the small nut section and ending with a diameter matching the of the large nut section, and the small, intermediate and large nut sections respectively having an identical number of sides and corners adapted to receive an opening of a wrench for turning the nut; and respective corners of the small, intermediate and large nut sections are arranged at identical angular orientations relative to a radius of the nut.

* * * * *